United States Patent [19]

Garcia-Clavel et al.

[11] Patent Number: 4,670,231

[45] Date of Patent: Jun. 2, 1987

[54] CONTINUOUS PROCEDURE OF OBTENTION OF COMPOUNDS OF ALUMINUM FROM ALUMINUM SILICATES AND OTHER ALUMINUM ORES

[75] Inventors: Maria-Emilia Garcia-Clavel, Bolivia 38, Madrid-16, Spain; Maria-Jesus Martinez-Lope; Maria-Teresa Casais-Alvarez, both of Madrid, Spain

[73] Assignee: Maria-Emilia Garcia-Clavel, Madrid, Spain

[21] Appl. No.: 848,902

[22] Filed: Apr. 4, 1986

Related U.S. Application Data

[63] Continuation of Ser. No. 609,476, May 11, 1984, abandoned.

[30] Foreign Application Priority Data

May 13, 1983 [ES] Spain .................................. 522398

[51] Int. Cl.$^4$ .............................................. C01F 7/14
[52] U.S. Cl. .................................. 423/127; 423/114; 423/115; 423/117
[58] Field of Search ................. 423/114, 115, 117, 127

[56] References Cited

U.S. PATENT DOCUMENTS

| | | | |
|---|---|---|---|
| 1,681,921 | 8/1928 | Bjorkstedt | 423/131 |
| 1,752,599 | 4/1930 | Kjellgren | 423/131 |
| 2,055,283 | 9/1936 | Fiske et al. | 423/117 |
| 2,160,148 | 5/1939 | Hunyady | 423/114 |
| 2,388,983 | 11/1945 | Lyons | 423/114 |
| 4,342,729 | 8/1982 | Clavel et al. | 423/115 |

Primary Examiner—H. T. Carter
Attorney, Agent, or Firm—Silverman, Cass, Singer and Winburn, Ltd.

[57] ABSTRACT

The invention is drawn to a continuous process for the recovery of alumina from ores by mixing with an alkali bisulfate, calcining below 450° C. to form the corresponding double salt, washing with water, and separating the insoluble residue from the solubilized aluminum, precipitating impure aluminum, resolubilizing aluminum with sodium hydroxide to form soluble sodium aluminate and separating it from the insoluble impurities, treating the resulting solution to form aluminum precipitate, separating the aluminum and calcining it to form alumina.

14 Claims, 1 Drawing Figure

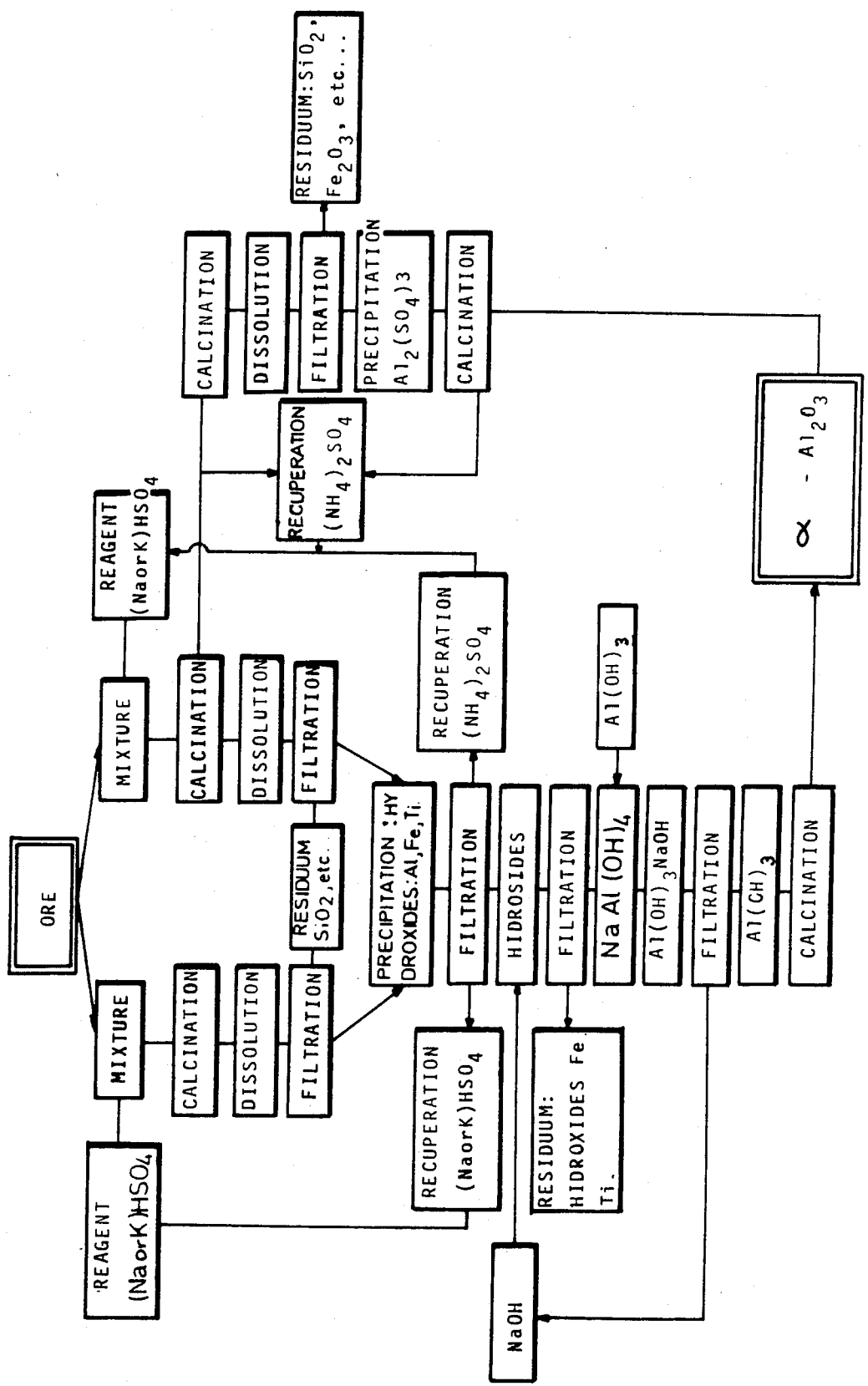

CONTINUOUS PROCEDURE OF OBTENTION OF COMPOUNDS OF ALUMINUM FROM ALUMINUM SILICATES AND OTHER ALUMINUM ORES

This application is a continuation of U.S. Ser. No. 609,476 filed May 11, 1984, now abandoned.

DESCRIPTIVE MEMORY

There are numerous international patents, as for example, U.S. Pat. No. 3,594,122; U.S. Pat. No. 2,388,983; U.S. Pat. No. 2,375,977; U.S. Pat. No. 1,752,599; U.S. Pat. No. 1,160,431; U.S. Pat. No. 957,848; Britannic No. 139,005; Britannic No. 25,228; Australian No. 17,524, which describe procedures for extracting alumina from clays using as reagent ammonium sulphate or sodium bisulphate, but satisfactory results have not been reached.

In the most of these patents, the reagent is employed in concentrated solution, in order to help its combination with the clay and the mixture is treated to form ribbons or noodles of small and uniform cross sectional area. This treatment of the mixture, previous to the extraction of the alumina, estimated as indispensable, requires a lot of apparatus and laborious manipulations.

Generally too, the reagent is used in a great excess: whether, in the moment of carrying out the mixture with the ore, or after the extraction reaction.

Sometimes, these patents need to employ ores with low content in alumina, or, if it is high, it is necessary to mix the ores with inert materials.

Sometimes, special ovens have to be designed.

All these conditions raise the price of the procedures a lot.

In some patents, which employ as reagent sodium bisulphate, the separation of the iron and the aluminum, both solubilized in the extraction reaction, is not mentioned although that problem is essential. In other cases, even iron solutions are added to the reacting powder.

In other patents, the separation has been tried by other procedures, not satisfactory either:

By calcination of the mixture clay-reagent at 600°–650° C. in order to obtain ferric oxide insoluble. But the aluminum sulphate obtained in this way, is not totally free of iron.

By fractionated crystallization of a ammonium alum, which will be separated from the solution in which the iron remains as sulphate (ferrous or ferric, according to the reducing or oxidizing treatment previously applied to the solution of aluminum and iron sulphates). But, as it is known, the separation of the iron by this fractionated crystallization procedure is not complete either, and the percentage of iron contained in the ammonium alum is superior to the admitted limits in the electrolisis of aluminum. Besides, the purification of the alum requires several recrystallizations, and for this reason the procedure is not income-yielding. And the succesive crystallizations cause losses of aluminum soluble in the mother liquors.

It is important to add that, generally, the titanium is not mentioned, and the amount of titanium must be very low in the alumina used in the electrolisis of aluminum. The inventors of this patent have also developed in the patent ES No. 482.881 and in U.S. Pat. No. 4,342,729, and EUROPEAN No. 80302522, a dry method reaction of extration of alumina from clays and aluminum silicates in general, employing the aforementioned ammonium sulphate or sodium bisulphate, reaction in which the mixture clay-reagent does not need any treatment previous to the reaction, and that it leads to the formation of a double sulphate, soluble in water.

Posterior studies, have allowed us to develop the mentioned process getting a continuous procedure of obtention of aluminum compounds from any aluminum ore, which allows us to obtain aluminas with different and even very high degree of purity, and aluminum sulphate with the degree of purity required generally for this compound.

DESCRIPTION OF THE PROCEDURE

The procedure of the present invention, whose scheme is given, may be applied to any aluminum silicate, clay or non clay raw materials, and all the other aluminum ores such as bauxites, alunites, laterites, etc. In the case of the coal schist, as these ores contain proportions not insignificant of coal and combustible organic compounds, the oxidizing toasting of the ore previous to the mixture with the reagent and to the reaction of extraction of the aluminum, may supply a proportion of the energy necessary for the extraction, making these ores one of the preferent raw materials.

The reagent, an oxysalt of monovalent cations of the type $ABSO_4$ (it may be $A=B$), in particular $NaHSO_4$, $KHSO_4$, $(NH_4)_2SO_4$, is employed in a solid form.

The aluminum ore is mixed with the reagent in the next molar proportions: aluminum/alkaline bisulphate $\frac{1}{3}$, aluminum/ammonium sulphate $\frac{1}{2}$.

The solid mixture does not need any special treatment. It is calcinated in an ordinary reactor. The mixture ore-ammonium sulphate is calcinated at a temperature below 450° C., preferably between 370°–430° C., during one hour approximately, obtaining the double sulphate, $AlNH_4(SO_4)_2$. The mixture ore-alkaline bisulphate, if a nearly-hermetic reactor is used, may be calcinated at a temperature below 200° C., preferably between 140°–180° C., during about 5 hours, obtaining the double sulphate $AlNa_3(or\ K_3)(SO_4)_3$. Economic criteria will determine the optimum point of equilibrium between the temperature and the calcination time.

The efficiency of these extraction reactions of aluminum is about 75–85%.

The double sulphate aluminum-alkali, aluminum-ammonium, obtained by a dry metho reaction, are soluble in water, cold and hot respectively, so may be separated by filtration from the silica, the unreacted ore and the insoluble impurities.

In the filtrate, which contains all the aluminum, iron and titanium solubilized, the correspondent hydroxides are precipitated. The precipitation is obtained with pyridine when the extraction reaction is carried out with Na (or K)$HSO_4$, or by the gases released during the formation of $AlNH_4(SO_4)_2$, when the reaction is carried out with $(NH_4)_2SO_4$. The precipitate is separated by filtration. This precipitate is treated with sodium hydroxide, which dissolves the whole aluminum as very pure sodium aluminate, while the iron and titanium hydroxides are not dissolved, and are separated by filtration.

Afterwards, the aluminum hydroxide is precipitated adding to the solution of sodium aluminate small amounts of aluminum trihydrate, which displaces the equilibrium $Al(OH)_3(s)+Na(OH)(ac) \rightleftharpoons NaAl(OH)_4(ac)$ to the left.

The formation of sodium aluminate as well as the precipitation of aluminum hydroxide are carried out without heating.

Finally, the calcination of the hydroxide provides a very pure alumina, suitable for being used in the obtention of aluminum by electrolysis.

If, after obtaining the $AlNH_4(SO_4)_2$ by dry method reaction (according to the above description), the temperature is elevated to above 475° C., the double sulphate is decomposed and $Al_2(SO_4)_3$ is formed at 600°–650° C. It is not advisable to go too far above this temperature to avoid the beginning of decomposition of the $Al_2(SO_4)_3$.

At that temperature, the iron is transformed, partly, in ferric oxide insoluble.

Since the aluminum sulphate is less soluble than the double sulphate of aluminum and ammonium, its dissolution in water requires either long heating at boiling point, or even better, at 120° C. By filtration it is separated from the silica, the ferric oxide and the rest of unreacted raw material.

On adding ethanol to the mentioned aqueous solution, the aluminum sulphate is precipitated and most of the iron still soluble remains in the hydroalcoholic solution.

The calcination of the aluminum sulphate allows the obtention of a quite pure alumina, suitable for different industrial uses.

If the process is stopped after the precipitation of the aluminum sulphate, this may be used as such aluminum sulphate, since its impurities are below the limit generally admitted.

The recuperation of the reagents is an easy operation and with a relatively low energetic cost.

The released gases, in the stage of formation of the double sulphate of aluminum-ammonium, as well as in the stage of transformation in aluminum sulphate and calcination of this last compound, are collected in water to recover the ammonium sulphate, which will be employed in the next reaction of extraction of alumina. The separation of solid ammonium sulphate is obtained: by evaporation of the water, by addition of an adequate solvent in which it precipitates (ethyl alcohol, acetone, preferably methanol) or by any other known procedure. When the precipitation is done with the gases released during the formation of the double sulphate aluminum-ammonium, the recuperation of the ammonium sulphate in the aqueous solution resulting from the filtration of the hydroxides precipitate is carried out in the same way.

If the aqueous solution resulting from the filtration of the precipitate of hydroxides contains pyridine and alkaline bisulphate, the pyridine is distilled (which will be used for a new quantitative precipitation of the hydroxides). From residue of distillation the sodium (or potassium) bisulphate is crystallized, which will be employed as reagent for the next mixture with new portions of ore.

The ethyl alcohol and the methanol are also recuperated by distillation, and they are used for new precipitations of the aluminum sulphate and the ammonium sulphate.

It is evident that with our invention it is possible to obtain alumina and aluminum sulphate from any aluminum ore, in a continuous, simple and economic process, energetically profitable, without subproducts (except if the iron and titanium can be made use of) and recycling the reagents. Only in the case of obtention of aluminum sulphate it is necessary to add, of course, sulphuric acid for each process.

We claim:

1. A continuous process for the production of alumina from aluminum ore comprising:
    (a) mixing aluminum ore with a bisulfate of the type $MeHSO_4$ where Me is sodium (Na) or potassium (K), in the molar proportion of approximately 1 part aluminum to 3 parts reagent;
    (b) calcining said mixture in a nearly hermetic reactor at below 200° C. to form a reaction product of a corresponding double salt, $AlMe_3(SO_4)_3$, where Me is Na or K;
    (c) dissolving said double salt in water to form an aqueous solution of said product and an insoluble residue of unreacted aluminum ore;
    (d) separating said aqueous solution from said insoluble residue;
    (e) treating said aqueous solution with pyridine to precipitate aluminum hydroxide $[Al(oH)_3]$ along with hydroxides of iron and titanium;
    (f) separating said hydroxides from said solution;
    (g) treating said precipitated hydroxides with a solution of sodium hydroxide to form a soluble sodium aluminate and to leave said hydroxides of iron and titanium as an unreacted precipitate;
    (h) separating said solution containing said sodium aluminate from said unreacted precipitate;
    (i) treating said solution with aluminum trihydrate to precipitate aluminum hydroxide from said solution;
    (j) separating said aluminum hydroxide from said solution; and
    (k) calcining said aluminum hydroxide to form alumina.

2. The process according to claim 1 wherein said temperature of step (b) is approximately 140°–180° C.

3. The process according to claim 1 wherein said temperature of step (b) is maintained for approximately 5 hours.

4. The process according to claim 1 further including recovering pyridine and a residue from said solution of step (f) by distillation.

5. The process according to claim 4 further including recovering said bisulfate of step (a) from said residue by crystallization.

6. The process according to claim 1 wherein 75–85% of said alumina of said aluminum ore is recovered.

7. A continuous process for the production of alumina from aluminum ore comprising:
    (a) mixing aluminum ore with ammonium sulfate in the molar proportion of approximately 1 part aluminum to 2 parts reagent;
    (b) calcining said mixture at below 450° C. to form a double salt reaction product, $AlNH_4(SO_4)_2$, and a reaction gas;
    (c) trapping said gasses;
    (d) dissolving said double salt in water to form an aqueous solution of said product and an insoluble residue of unreacted aluminum ore;
    (e) separating said aqueous solution from said insoluble residue;
    (f) treating said aqueous solution with said trapped gasses of step (c) to precipitate aluminum hydroxide $[Al(OH)_3]$ along with the hydroxides of iron and titanium;
    (g) separating said hydroxides from said solution;
    (h) treating said precipitated hydroxides with a solution of sodium hydroxide to form a soluble sodium aluminate and to leave said hydroxides of iron and titanium as an unreacted precipitate;

(i) separating said solution containing said sodium aluminate from said unreacted precipitate;

(j) treating said solution with aluminum trihydrate to precipitate aluminum hydroxide from said solution;

(k) separating said aluminum hydroxide from said solution; and (l) calcining said aluminum hydroxide to form alumina.

8. The process according to claim 7 wherein said temperature of step (b) is approximately 370°–430° C.

9. The process according to claim 7 wherein said temperature of step (b) is maintained for approximately 1 hour.

10. The process according to claim 7 wherein said gas is trapped in the aqueous solution of said double salt.

11. The process according to claim 7 wherein 75–85% of said alumina of said aluminum ore is recovered.

12. A continuous process for the production of alumina from aluminum ore comprising:

(a) mixing aluminum ore with ammonium sulfate in the molar proportion of approximately 1 part aluminum to 2 parts reagent;

(b) calcining said mixture at below 450° C. to form a double salt reaction product, $AlNH_4(SO_4)_2$, and a reaction gas;

(c) decomposing said double salt to form aluminum sulfate $[Al_2(SO_4)_3]$ and an insoluble ferric oxide by elevating the temperature of said mixture to above 475° C.;

(d) dissolving said aluminum sulfate in water to form an aqueous solution of said aluminum sulfate and an insoluble residue of unreacted aluminum ore;

(e) separating said aqueous solution from said insoluble residue;

(f) treating said aqueous solution with ethanol to precipitate said aluminum sulfate out of solution;

(g) separating said aluminum sulfate from said aqueous solution; and (h) calcining said aluminum sulfate to form alumina.

13. The process according to claim 12 wherein said temperature of step (c) is approximately 600°–650° C.

14. The process according to claim 12 wherein said water in step (d) is heated to approximately the boiling point.

* * * * *